J. R. HARBECK.
WATERPROOFED PAPER TUBE OR CAN BODY.
APPLICATION FILED JAN. 23, 1911.
1,173,267. Patented Feb. 29, 1916.
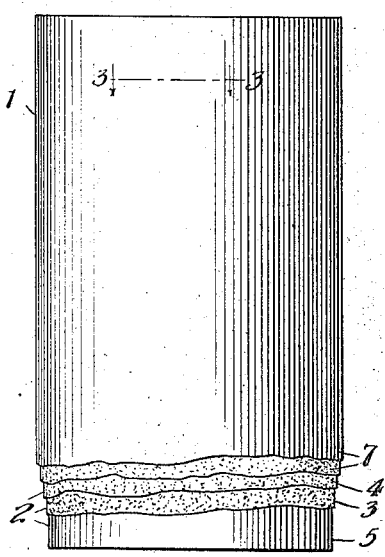
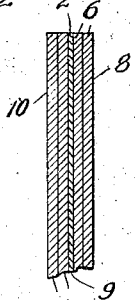
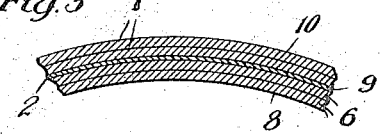
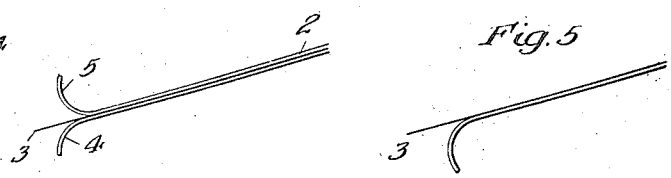
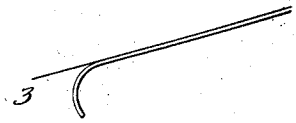
Witnesses:
Wm. Geiger
Pearl Abrams
Inventor:
Jervis R. Harbeck
By Munday, Evarts, Adcock
& Clarke
Attys.

UNITED STATES PATENT OFFICE.

JERVIS R. HARBECK, OF DETROIT, MICHIGAN, ASSIGNOR TO DETROIT CAN COMPANY, OF DETROIT, MICHIGAN, A CORPORATION OF NEW JERSEY.

WATERPROOFED PAPER TUBE OR CAN-BODY.

1,173,267.  Specification of Letters Patent.  Patented Feb. 29, 1916.

Application filed January 23, 1911. Serial No. 604,145.

*To all whom it may concern:*

Be it known that I, JERVIS R. HARBECK, a citizen of the United States, residing in Detroit, in the county of Wayne and State of Michigan, have invented a new and useful Improvement in Waterproofed Paper Tubes or Can-Bodies, of which the following is a specification.

My invention relates to improvements in the construction of laminated paper tubes or can bodies of the kind which are commonly known as proofed or designed to be impervious to passage of liquids or gases.

The object of my invention is to provide an improved construction of proofed laminated paper body or tube, which will be thoroughly efficient in its proofing function or in respect to imperviousness to passage of liquids or gases, and also strong and durable, and which at the same time may be of such construction as to be capable of being rapidly and cheaply manufactured without special machinery.

My invention consists in a laminated paper tube or body comprising a plurality of layers or coils of paper or tube-material and an interposed composite proofing layer or coil comprising a dry, solid, continuous film of asphaltum or proofing compound embraced between and securely united to a fibrous layer, preferably extremely thin, close, flexible paper, on one or both faces of the asphaltum or proofing compound film, the thin paper or fibrous layer or layers adapting the proofing layer or member to be adhesively united to the layer or layers of tube-material with which it contacts and between which it is interposed, and also serving as a carrier or supporting medium for introducing the asphaltum or proofing compound film between the layers of tube-material as the tube is being formed in the winding operation.

In the accompanying drawing forming a part of this specification, Figure 1 is a side elevation of a short piece of proofed, convolutely wound laminated paper tube embodying my invention, the same being such as is used for can bodies. Fig. 2 is an enlarged detail, partial, longitudinal section, and Fig. 3 is an enlarged cross section on line 3—3 of Fig. 1 and Fig. 4 is an enlarged detail section of a small portion of the composite proofing member layer. Fig. 5 shows a modified form of a composite proofing member layer.

In the drawing, 1 represents the proofed paper can body or tube, the same as shown being convolutely wound, 2 the proofing member layer comprising a dry, solid, continuous film of asphaltum or proofing compound 3 interposed between and securely united to external layers 4, 5 of fibrous material, preferably thin, close paper; 6, coils or layers of tube-material, preferably relatively thick paper, inside the proofing member layer 2; and 7 tube-material layers or coils, preferably of relatively thick paper outside the proofing member layer.

The tube-material layers inside and outside the proofing member layer may each be any desired number, and the proofing member layer may be interposed at any desired point in the thickness of the paper tube or body 1, as may be desired. The several successive tube-material layers are adhesively united together at their contacting faces in the usual manner by glue, paste or other adhesive material applied to one face of the web of paper or other fibrous tube-material from which the tube is formed by winding in the usual manner. And one face of the proofing member layer 2 is also adhesively united to the adjacent face of the tube-material layer with which it contacts. The other face of the proofing member layer is unglued, thus leaving a line of cleavage or unglued surface between the glued layers on one side of the proofing member and those on the other, and in effect forming a paper tube or body comprising an inner laminated member 8, having glued to its surface a proofing member 9, and connected convolutely with a second surrounding laminated tube member 10, the whole having the effect of being practically one structure, but having intermediate of its thickness a line of cleavage or unglued surface. This line of cleavage or unglued surface, however, I find has no detrimental effect, the complete body or tube 1 being substantially as stiff and strong, and all its parts or layers as firmly united and as effecually mutually supporting and strengthening each other as though the line of cleavage or unglued surface were not present.

In the drawing, the relative thickness of the tube-material layers and proofing member layer is exaggerated for greater clearness of illustration, and this applies specially to the proofing film and the fibrous layers united thereto, all of which in practice are extremely thin.

I claim:—

1. A moisture-proofed and impervious container body the walls of which consist of a layer of porous thin paper united with a film of fused cement to form a compound proofing member, and a layer of paper tube material coiled upon itself and having the compound proofing member interposed between and adhesively united to the coils thereof.

2. A moisture-proofed and impervious container body the walls of which consist of two layers of porous thin paper united with an interposed film of fused cement to form a compound proofing member, and a layer of paper tube material coiled upon itself and having the compound proofing member interposed between and adhesively united to the coils thereof.

JERVIS R. HARBECK.

Witnesses:
W. J. CULLEN,
D. C. SNYDER.